United States Patent [19]

Brauer

[11] Patent Number: 4,910,917
[45] Date of Patent: Mar. 27, 1990

[54] BOWDEN CABLE EQUIPPED WINDOW LIFT

[75] Inventor: Gerhard Brauer, Solms-Oberbiel, Fed. Rep. of Germany

[73] Assignee: Kuster & Co. GmbH., Ehringshausen, Fed. Rep. of Germany

[21] Appl. No.: 226,813

[22] Filed: Aug. 1, 1988

[30] Foreign Application Priority Data

Aug. 14, 1987 [DE] Fed. Rep. of Germany ....... 3727153

[51] Int. Cl.$^4$ ............................................. E05F 11/38
[52] U.S. Cl. ......................................... 49/348; 49/375; 49/452
[58] Field of Search .................. 49/375, 374, 349, 348, 49/452

[56] References Cited

U.S. PATENT DOCUMENTS 3,703,053 11/1972 De Rees et al. ...................... 49/375
4,586,290 5/1986 Juechter ................................ 49/375

FOREIGN PATENT DOCUMENTS 3243123 5/1984 Fed. Rep. of Germany .

Primary Examiner—Kenneth J. Dorner
Assistant Examiner—Gerald A. Anderson
Attorney, Agent, or Firm—Wells & White

[57] ABSTRACT

The invention concerns a bowden cable window lift with two guide rails along which the window pane is guided in sliding manner by means of two drive plates actuated by the bowden cable. To compensate for lack of parallelism of the guide rails due to assembly of the window lift, adjustment means are mounted on at least one drive plate whereby the pan can be tipped in its plane and furthermore allowing lateral displacement of the pane relative to the guide rail guiding the drive plate. The adjustment means effecting the tipping of the pane is an adjustable and lockable eccentric stud, and the lateral adjustment of the pane is implemented by an elongated slot in the drive plate within which the eccentric stud is moved transversely.

1 Claim, 2 Drawing Sheets

BOWDEN CABLE EQUIPPED WINDOW LIFT

CROSS-REFERENCE TO A RELATED APPLICATION

Applicant claims priority under 35 USC 119 for application No. P37 27 153.9 filed Aug. 14, 1987 in West Germany.

BACKGROUND OF THE INVENTION

The field of the invention is bowden cable equipped window lifts and the present invention is particularly concerned with window lifts with two guide rails for use in motor vehicles.

The state of the art of automotive window lifts with two guide rails may be ascertained by reference to West German Published Application No. 3,243,123 the disclosure of which is incorporated herein by reference.

In window lifts of the bowden cable type having two guide rails, the window pane to be moved is guided on both guide rails. The pane is held in attachments in turn sliding along the guide rails in suitable U-channels or the like. The bowden cable acts on the attachments, and is in turn displaced by means of a crank-provided cable drum, whereby the pane is raised or lowered.

The two guide rails are mounted separately in the motor vehicle door and ideally are lined up in perfect parallelism. However this is possible only very rarely on account of the manufacturing tolerances affecting both the screw tightening holes in the guide rails themselves and the corresponding holes in the vehicle door. Consequently these guide rails practically are not mutually parallel. Accordingly the pane guided in the rails may jam.

SUMMARY OF THE INVENTION

The object of the invention is to create a window lift of the cited type overcoming these drawbacks and permitting problem free motion of the window pane even if the guide rails are not mutually parallel.

This object is achieved by a bowden cable window lift for displacing a window pane in a motor vehicle or the like having two guide rails each holding the window pane by a drive plate guided in sliding but geometrically locking manner at the guide rails and acted on by the bowden cable displacing the window pane. At least one of the two drive plates is equipped both with adjustment means to set the height of the pane end fastened to it and with adjustment means allowing a lateral displacement of the entire window pane transversely to this drive plate, i.e., to a guide rail guiding this drive plate.

The objective is achieved by mounting an eccentric stud in at least one of the attachments setting the height of one of the pane corners, this stud compensating pane obliqueness and providing simultaneously an elongated slot allowing this eccentric stud to slide transversely to the direction of motion of the pane.

BRIEF DESCRIPTION OF THE DRAWINGS

These details are shown in an illustrative embodiment in the drawings, wherein.

DESCRIPTION OF THE PREFERRED EMBODIMENT

Figure 1:
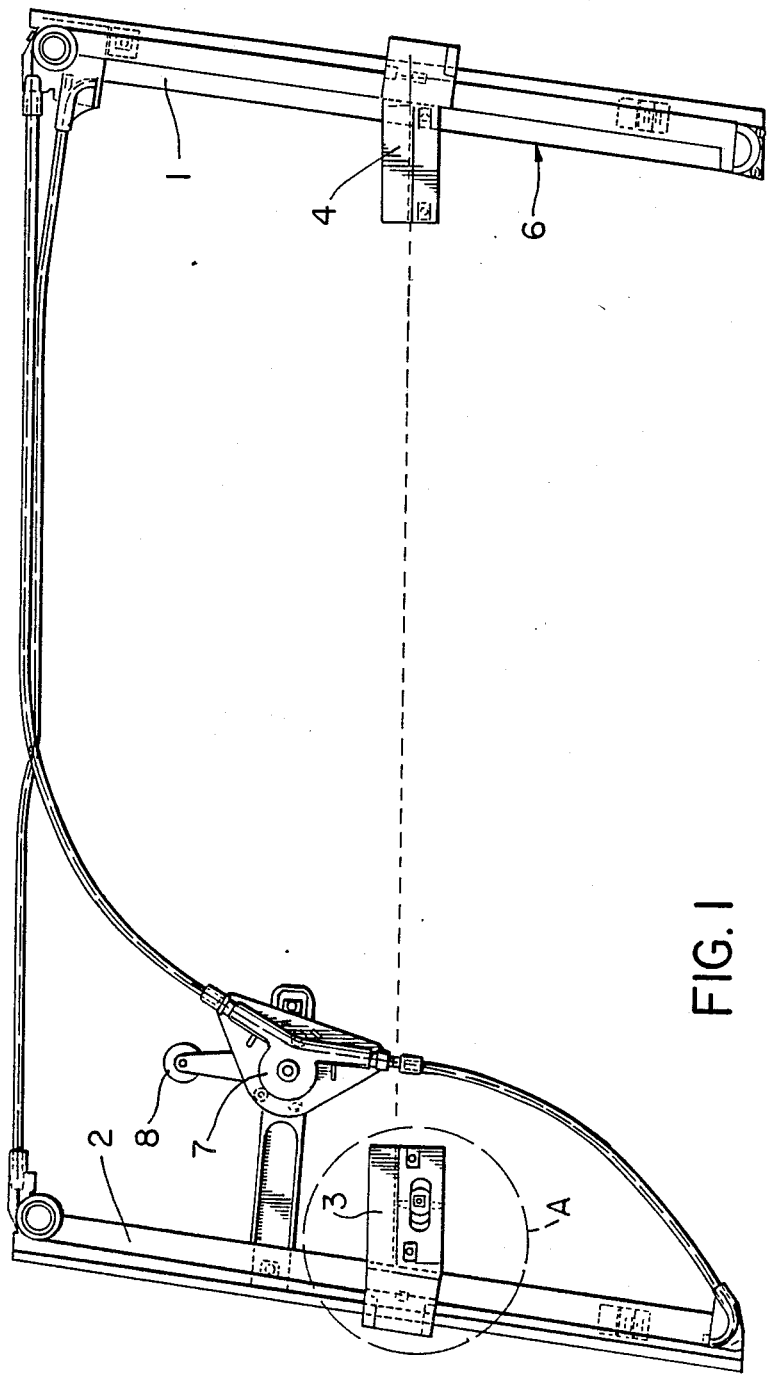
FIG. 1 is an elevation of the window lift with the adjustment means of the invention.

FIG. 1 shows the guide rails 1 and 2. One of the two drive plates 3 and 4 jointly supporting the window pane 5 moves along these rails, only the lower edge of the pane being indicated by dashed lines.

The wire of a bowden cable 6 acts on the drive plates 3 and 4, this wire being wound at 7 about a drum rotatable by means of crank 8. The bowden cable crosses between the guide rails 1 and 2. When the drum is rotated, the two drive plates 3 and 4 slide in the same direction and hence lift or lower the pane.

As mentioned above, no problems would be encountered if the two guide rails 1 and 2 were always mutually precisely parallel. However, this is hardly ever the case, and the pane on occasion jams when being displaced, and this jamming is avoided by the adjustment means of the invention. These adjustment means are mounted on at least one drive plate and allow both height adjustment of the window pane edge supported in the drive plate (= tipping the pane in its plane) and lateral displacement of the entire pane during upward or downward motion.

In the embodiment shown in the drawings, these adjustments are shown present on the drive plate 3 on the left of FIG. 1. This item A of FIG. 1 is shown enlarged in FIGS. 2, 3 and 4.

Figure 2:
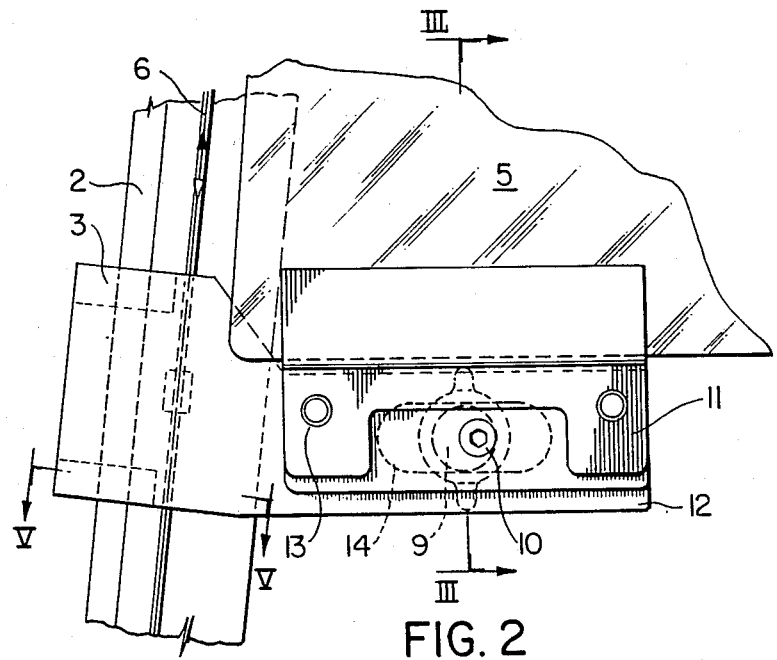
FIG. 2 is an enlargement of the region A of FIG. 1.
Figure 5:
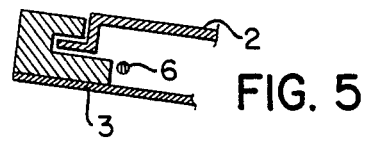
FIG. 5 is a detailed showing in cross-section along the line V—V of FIG. 2.

FIG. 2 shows part of the guide rail 2 along which the drive plate 3 is guided by the bowden cable 6. This plate 3 supports by means of an eccentric stud 9 and a tightening screw 10 two fastener plates 11, 12 holding the pane 5 between them. These fastener plates 11, 12 are rigidly joined together by screws, rivets 13 or the like (FIG. 2) and thereby amount to a single operating part which however can be displaced both in height and laterally relative to the drive plate 3 by the adjustment means.

The height-adjusting component of the adjustment means is the eccentric part of the stud 9, while the lateral adjustment means is an elongated slot 14 in the drive plate 3 (FIG. 2).

The various parts cooperate as follows: First the window pane 5 together with its fastener plates 11, 12 is set on the drive plate 3 and kept loosely in place by the tightening screw 10 which is turned into a thread in the plate 12. Thereupon the height of this pane corner is adjusted by rotating the eccentric stud 9 at its wings 9a that the lower edge of the pane 5 is horizontal. For that position, the screw 10 is then tightened, whereby height adjustment is completed. Because of the width of the pane, it will only tip insignificantly inside the other drive plate 4, and this motion is compensated by the play of the drive plate 4 at the guide rail 1.

The lateral compensation required to prevent jamming when raising or lowering the pane 5 when the guide rails 1 and 2 are not parallel is achieved by the sliding motion of the eccentric stud 9 in the elongated slot 14. This presumes however that the eccentric part of the stud 9 is slightly thicker than the plate or sheet thickness of the drive plate 3. This is indicated in FIG. 3 by the dimensions "a" and "b," with a greater than b.

Figure 3:
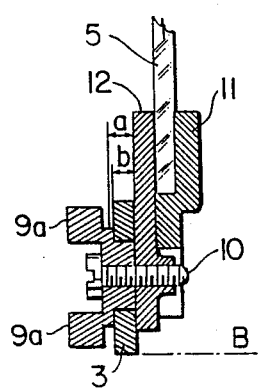
FIG. 3 is a cross-section of FIG. 2 at the height III—III of Fig. 2 in a first adjusted position.
Figure 4:
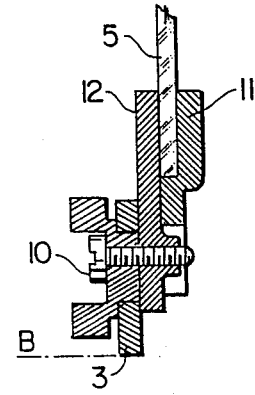
FIG. 4 is a cross-section of FIG. 2 at height III—III of FIG. 2 in a second adjustment position.

FIG. 3 shows the direct section of FIG. 2 at the height III—III with the eccentric stud 9 in the center position. FIG. 4, on the other hand, shows the eccentric stud having been rotated into one of its end positions.

When comparing the two Figures, it appears clearly that the position of the drive plate 3 is unchanged. The two Figures show the same height of the pane, as indicated by the line B. On the other hand the elevation of the plates 11, 12 with the window pane 5 has changed. This position was shifted upward by half the eccentricity of the stud 9.

When the window pane is raised or lowered through its entire displacement path, and when the guide rails 1 and 2 are not mutually parallel, then the side of the pane mounted to the driver plate 4 is moved in the direction of its guide rail because it is joined to this rail in sliding manner. The other side of the pane however moves relative to the drive plate 3 transversely to the direction of motion of the pane. This process is made possible by the slot 14 which is appropriately elongated.

Moreover, the adjustment means of the invention also can be fruitfully mounted on a window lift with a single, centrally mounted guide rail in the case of the driver acting on the window pane laterally from the guide rail.

I claim:

1. A bowden cable window lift for displacing a window pane in a motor vehicle or the like, having first and second guide rails, first and second drive plates each holding a window pane guided in sliding but geometrically locking manner at said guide rails, said drive plates actuated by a bowden cable displacing said window pane, said first drive plate (3) equipped both with height adjustment means (9) to set a height of said window pane and independent lateral adjustment means (14) allowing a lateral displacement of said window pane (5) transversely to said first drive plate (3) and to said first guide rail (2) guiding said first drive plate (3), wherein said height adjustment means is an eccentric stud (9) mounted in adjustable and lockable manner to said first drive plate (3) sliding at said first guide rail (2) and supporting said window pane (5) by means of fastener plates (11; 12), and said lateral adjustment means for the lateral displacement of said window pane (5) consists of an elongated slot (14) in said first drive plate (3) essentially perpendicular to the direction of displacement of said window pane (5) and within which said eccentric stud (9) glides laterally.

* * * * *